United States Patent Office 2,985,616
Patented May 23, 1961

2,985,616
CURABLE EPOXY COMPOSITIONS AND RESINS MADE THEREFROM

Charles W. McGary, Jr., and Charles T. Patrick, Jr., South Charleston, W. Va., assignors to Union Carbide Corporation, a corporation of New York No Drawing. Filed July 30, 1957, Ser. No. 675,011

14 Claims. (Cl. 260—45.4)

This invention relates to curable epoxide compositions and resins made therefrom. More particularly, this invention relates to curable compositions comprising dicyclopentadiene dioxide, polycarboxylic acid anhydrides and polyols and resins made therefrom.

This application is a continuation-in-part of application Serial No. 629,475, filed December 20, 1956.

Our resins are tough and water resistant. They can be made as hard, rigid, infusible products; as soft, flexible, infusible products or as products having intermediate degrees of hardness and rigidity or softness and flexibility, as desired. They can be produced with excellent high temperature load carrying capabilities as measured by heat distortion values which in certain of our resins reach as high as 264° C. Certain of our resins also exhibit good strength properties at room temperature and excellent strength properties at elevated temperatures. In particular, glass cloth laminates of these resins possess excellent flexural strength which in certain cases are as high as 74,700 p.s.i. at room temperature and 47,100 p.s.i. at 500° F.

Our curable compositions at room temperature range from low viscosity liquids to solids, which are easily handled and can be easily polymerized by maintaining the composition at an elevated temperature for a period of time. The solid compositions are particularly valuable as molding powders and as laminating powders for such applications as preloading glass cloth. The preloaded glass cloth may then be laminated in the usual manner to produce glass laminates with outstanding strengths. By elevating the temperature of our solid compositions, low viscosity, curable, liquid compositions are obtained. These liquid compositions have pot-lives of sufficient duration to permit the addition to fillers and pigments to alter the physical characteristics and appearance, respectively, of our resins. With or without fillers and pigments the liquid compositions are readily pourable and are capable of flowing into intricate corners of molds so that accurately molded articles result. The liquid compositions also can be flowed, sprayed or spread on surfaces and cured to provide durable, protective finishes thereto. They may be similarly applied to sheets of material for making laminates. In this connection the liquid compositions have been found to exhibit excellent wettability towards a large variety of materials, such as, glass and metals. Our curable compositions whether liquid or solid, are also soluble in many organic solvents, such as acetone, butyl acetate, toluene, ethyl acetate, methyl isobutyl ketone, xylene and the like. Solutions thus formed can be flowed, sprayed or spread on surfaces, the solvent driven off and the composition cured to provide durable coatings. Our compositions also can be partially cured to solid resins, ground or granulated and employed as molding or laminating materials.

The curable compositions of this invention can be advantageously made by mixing dicyclopentadiene dioxide with a polycarboxylic acid anhydride and a polyol. Dicyclopentadiene dioxide is a crystalline solid which melts at about 184° C. and can be readily dissolved by many solvents including liquid polycarboxylic acid anhydrides and polyols at temperatures well below its melting point. The compositions can be prepared in any suitable manner as by mechanically mixing the liquid or granular forms of dicyclopentadiene dioxide with the liquid or granular forms of the polycarboxylic acid anhydride and polyol. It is preferred to form a homogeneous mixture of dicyclopentadiene dioxide, polycarboxylic acid anhydride and polyol prior to curing. When both the anhydride and polyol are solids at room temperature, it is advantageous to raise the temperature of a mixture of dicyclopentadiene dioxide, anhydride and polyol until a solution is formed. When a liquid anhydride or polyol is used, it is advantageous to add the solid components to the liquid component and raise the temperature, if necessary, to form a solution. However, any suitable method or sequence of mixing the components can be employed. Temperatures required for forming a solution have been found to vary from 25° C. to 200° C. depending upon the melting point and solubility and solvent characteristics of the particular polycarboxylic acid anhydride and polyol employed. Stirring aids the formation of a solution or homogeneous mixture, although it may not be necessary. After all of the composition components have been mixed, the solutions can be cooled to room temperatures and stored for future use, if desired, or used immediately. Granular or powdered dicyclopentadiene dioxide can be used also and, when a solid polycarboxylic acid anhydride and polyol are used, the granular or powdered forms thereof can be mechanically mixed with the granular or powdered form of dicyclopentadiene dioxide to produce a curable composition which is particularly useful as a molding composition or a preloading composition for making glass laminates.

Acidic and basic catalysts can be added, if desired, to speed the rate of cure. Catalysts in amounts ranging up to 5.0 weight percent based on the weight of dicyclopentadiene dioxide can be added at this point, at any time prior to curing or not all, as desired. Higher catalyst concentrations above this range are also effective, although concentrations of 5.0 weight percent and below have been found to be adequate. Catalyst concentrations of 0.01 to 5.0 weight percent based on the weight of dicyclopentadiene dioxide are particularly preferred. Other polyfunctional materials also may be incorporated into our curable compositions. Such polyfunctional materials include other polyepoxides, e.g., polyglycidyl ethers of polyhydric phenols and the like, low molecular weight urea-formaldehyde or phenol-formaldehyde polymers and the like. Many variations in the physical properties of our resins can be obtained by employing such other polyfunctional materials in our curable compositions.

Curing can be carried out by maintaining the curable compositions at temperatures from 50° C. to 250° C. Temperatures higher than 250° C. can be used, although some discoloration which may not be desired in the resin may result. The time for effecting a complete cure can be varied from several minutes to several hours.

It has been found that those compositions which contain difunctional polycarboxylic acid anhydrides, i.e., anhydrides having two carboxy equivalents, and difunctional polyols, i.e., polyols having two hydroxyl equivalents tend to form more flexible resins when cured than compositions containing anhydrides and polyols of greater functionality. Compositions which contain anhydrides having greater numbers of interconnected atoms in the shortest chain between the carbonyl carbons of the oxydicarboxyl group of the anhydride, e.g., adipicanhydrides, are believed to form softer, more flexible resins than corresponding compositions containing anhydrides of the same functionality but which have fewer interconnected atoms in the shortest carbon chain between carbonyl carbons of the oxidicarbonyl group thereof, e.g., maleic anhydride. Similarly, softer more flexible resins can be made from compositions which contain polyols having greater numbers of interconnected atoms in the shortest chain between the hydroxyl groups of the polyol, e.g., polyethylene glycol, average molecular weight of 200, than resins made from corresponding compositions containing polyols of the same functionality but which have fewer interconnected atoms in the shortest chain between the hydroxyl groups thereof, e.g. ethylene glycol. The hardness and rigidity of resins formed from our compositions can be controlled also by the use of different relative amounts of diepoxide, anhydride and polyol in said compositions. We have found that higher concentrations of hydroxy equivalents and lower concentrations of hydroxy equivalents lead to harder, more highly cross-linked resins of higher heat distortion values and, conversely, lower concentrations of carboxy equivalents and higher concentrations of hydroxy equivalents lead to softer, more flexible resins of lower heat distortion values. It was also discovered that the higher concentrations of carboxyl groups increased the curing rate. Thus, resins having a wide range of properties can be produced.

Infusible resins which are water-resistant and insoluble in many organic solvents can be made from our curable compositions. Illustratively, such resins can be made from compositions which contain dicyclopentadiene dioxide, polycarboxylic acid anhydrides in such amounts as to provide about 0.16 to 5.0 carboxy equivalents of the anhydride for each epoxy equivalent of the diepoxide and polyols in such amounts as to provide up to about 2.0 hydroxyl equivalents of the polyol for each epoxy equivalent of the diepoxide. Hard, infusible resins having high heat distortion values and which are also water-resistant and insoluble in most organic solvents also can be made from our curable compositions. Illustratively, hard, high heat distortion resins of this type can be prepared from compositions which contain dicyclopentadiene dioxide, polycarboxy acid anhydrides in such amounts as to provide about 0.33 to 4.0 carboxy equivalents of the anhydride for each epoxy equivalent of the diepoxide and polyols in such amounts as to provide about 0.16 to 2.0 hydroxyl equivalents of the polyol for each epoxy equivalent of the diepoxide.

By the term "polyol," as used herein, is meant an organic compound having at least two hydroxyl groups which are alcoholic hydroxyl groups, phenolic hydroxyl groups or both alcoholic and phenolic hydroxyl groups. Typical polyols can be represented by the general formula:

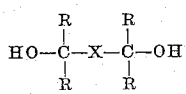

wherein R can be an alkyl group or hydrogen and can be the same or different for all R's in the molecule. X can be a single bond or a divalent group composed of a carbon atom or group of carbon atoms interconnected by single or multiple bonds and to which such groups as hydrogen, alkyl, hydroxyl, amino, cyclic groups and the like or combinations thereof can be attached. X can also represent such divalent groups as oxyalkylene or polyoxyalkylene groups. X, as a divalent group may also contain nitrogen to which other groups, for example, hydrogen, alkyl, alkanol and the like may be attached or it may represent a carbon atom group which contains sulfur. It can also represent cyclic groups, such as phenylene, cyclohexylene and the like. The R's and X together with the carbon atoms, i.e., the C's of the formula, can represent a cyclic group such as phenylene, cyclohexylene and the like. The presence of other groups, with the exception of tautomeric enolic groups, not specifically listed herein and not participating in the curing reaction is by no means harmful and, in fact, can be useful in developing special properties in our resins. Mixtures of polyols or only one polyol can be employed in our curable compositions.

Representative polyols which can be employed in our compositions are polyhydric alcohols, such as, ethylene glycol, diethylene glycol, polyethylene glycol, propylene glycol, tripropylene glycol, polypropylene glycols, polyethylenepolypropylene glycols, trimethylene glycol, butanediols, pentanediols, 2-ethyl-1,3-hexanediol, 2-methyl-2,4-pentanediol, 12,13-tetracosanediol, 2-butene-1,4-diol, 2-methoxymethyl-2,4-dimethyl-1,5-pentanediol, diethanolamine, triethanolamine, glycerol, polyglycerols, pentaerythritol, sorbitol, polyvinyl alcohols, cyclohexanediols, cyclopentanediols, inositol, trimethylolphenol, 2,4,6-trimethylolphenyl allyl ether, and polyhydric phenols, such as, dihydroxytoluenes, resorcinol, bisphenol A, i.e., bis(4-hydroxyphenyl)-2,2-propane, bis(4-hydroxyphenyl) methane, the polyhydric phenolic-formaldehyde condensation products, and the like. Polyols which are free of acetylenic unsaturation and composed of carbon, hydrogen and oxygen combined as hydroxyl oxygen or ether oxygen connecting two otherwise unconnected carbon atoms and having not more than 24 carbon atoms are preferred.

Polycarboxylic acid anhydrides useful in producing our resins can be represented by the formula:

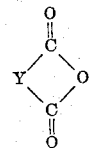

wherein Y represents two or more carbon atoms interconnected by single or double bonds and to which such groups as hydrogen, alkyl, hydroxyl, nitro, chloro, iodo, bromo, cyclic groups and the like or combinations thereof may be attached. Y can also represent groups containing carbon atoms interconnected by single or double bonds and oxydicarboxyl groups, i.e.,

interconnecting the carbon atom groups to which such other groups as previously mentioned may be attached. Y may also represent such cyclic groups as phenylene, cyclohexylene, cyclohexenylene, and the like which may have one or more oxydicarbonyl groups attached thereto. Polycarboxylic acid anhydrides, containing other groups not specifically mentioned herein, and not taking part in the curing reaction can be used in our curable compositions without harmful effects, and, in fact, can be used to develop particular properties in our resins. One polycarboxylic acid anhydride or a mixture of two or more, as desired, can be used in our curable compositions. Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride, hexachloroendomethylenetetrahydrophthalic anhydride, hereinafter referred to as chlorendic anhydride, tetrabromophthalic anhydride, tetraiodophthalic anhydride, phthalic anhydride, 4-nitrophthalic anhydride, 1,2-naphthalic anhydride, 1,8-naphthalic anhydride, 2,3-naphthalic anhydride, 1,2,4,5-benzenetetracarboxylic dianhydride, polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our curable compositions include the Diels-Alder adducts of maleic acid and aliphatic compounds having conjugated double bonds. Preferred polycarboxylic acid anhydrides are those which are soluble in dicyclopentadiene dioxide at temperatures below about 250° C.

Dicyclopentadiene dioxide is a solid diepoxide having a melting point of about 184° C. This diepoxide can be illustrated by the formula:

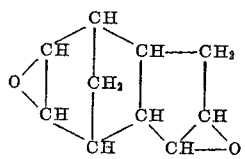

The diepoxide can be prepared by the epoxidation of the olefinic double bonds of dicyclopentadiene employing suitable epoxidizing agents.

Suitable epoxidizing agents for the epoxidation reaction include peracetic acid and acetaldehyde monoperacetate. The epoxidation reaction can be advantageously carried out by charging dicyclopentadiene to a reaction vessel and then gradually adding the epoxidizing agent. In order to provide ease of handling and to avoid the formation of highly concentrated or crystalline peracetic acid with its attendant explosion hazard, the epoxidizing agent preferably is employed in a solvent, as for example, acetone, chloroform, methylethyl ketone, ethyl acetate, butyl acetate, and the like. The reaction can be carried out at a temperature within the range of about —25° C. to 150° C., although lower and higher temperatures may be used. However, longer reaction times are needed at the lower temperatures to produce high yields. At the higher temperatures, side reactions form undesirable materials which can be removed, however, by conventional purification procedures, such as, fractional distillation. The reaction is continued until an analysis for expoxidizing agent indicates that an amount at least sufficient to epoxidize all the double bonds of dicyclopentadiene has been consumed. In this connection it is desirable to employ an excess over the theoretical amount of peracetic acid to assure complete epoxidation. Upon discontinuance of the reaction, side-reaction products, solvent and unreacted material are removed by any convenient procedure, such as, by adding a potboiler, e.g., ethylbenzene, and stripping low-boiling materials. A solid material, identified as dicyclopentadiene dioxide, is obtained. Dicyclopentadiene dioxide can be accepted as a residue product and subsequently further refined by distillation, extraction or crystallization, if desired.

Catalysts which can be employed with advantageous effects in accelerating the cure of our compositions are the basic and acidic catalysts including strong alkalis, mineral acids and metal halide Lewis acids. Typical strong alkalis include the alkali metal hydroxides, e.g., sodium hydroxide and potassium hydroxide, and quaternary ammonium compounds, e.g., benzoyltrimethylammonium hydroxide, tetramethylammonium hydroxide and the like; and tertiary amines, e.g., benzyldimethyl amine, dimethylaminomethylphenol, 2,4,6-tris (dimethylaminoethyl) phenol and the like. Representative of mineral acids which can be used in speeding the formation of our resins are sulfuric acid, perchloric acid, polyphosphoric acid and the various sulfonic acids, such as, toluene sulfonic acid, benzene sulfonic acid and the like. Metal halide Lewis acids which are also effective in speeding the cure of our resins include boron trifluoride, stannic chloride, zinc chloride, aluminum chloride, ferric chloride and the like. The metal halide Lewis acid catalysts can also be used in the form of such complexes as etherate complexes and amine complexes, for example, boron trifluoride-piperidine and boron trifluoride-monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in our compositions prior to curing has been found to be desirable in order to obtain homogeneous resins and to minimize localized curing around catalyst particles. Agitation of the compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethylpropionate, organic ketones, e.g., acetone, methylisobutylketone, cyclohexanone, organic alcohols, e.g., methanol, cyclohexanol, propylene glycol and the like. The mineral acids and strong alkalis can be employed as solutions in water, whereas metal halide Lewis acid catalysts tend to decompose in water and aqueous solutions of such Lewis acids are not preferred.

Our curable compositions can be used in coatings, castings, moldings, bondings, laminates and the like in the manufacture of articles having a multitude of uses. These compositions can be colored by pigments and very appealing appearances may be imparted to articles made therefrom. Fillers can also be incorporated in our compositions so as to impart special properties to articles manufactured therefrom. Such sundry articles as buttons, combs, brush handles, structural parts for instrument cabinets and the like can be formed through the use of our curable compositions and resins. Of particular importance, are uses of our hard, tough resins of high heat distortion values in industrial applications wherein load carrying capabilities at high temperatures are required. Uses of this kind include hot fluid carrying conduits, high temperature tools and dies, minor structural parts and high temperature electrical insulation for high-speed aircraft and the like.

The following examples are presented. In these examples "parts" designates parts by weight. Barcol hardness values were determined through the use of a Barcol Impressor GYXJ 934–1. Izod impact values were determined in accordance with ASTM method D–256–57T and are recorded in foot-pounds per inch of notch. Heat distortion values were determined by the ASTM method of D–648–45T and are recorded as degrees centigrade under a 264 p.s.i. load. Flexural strength values were obtained according to ASTM method D–790 and are expressed in p.s.i. Compression strength values and tensile strength values were determined in accordance with ASTM methods D–229 and D–638, respectively, and are expressed in p.s.i. Unless otherwise specified, room temperatures are temperatures in the 20° C. to 30° C. range.

EXAMPLES 1 THROUGH 19

Nineteen mixtures were prepared from dicyclopentadiene dioxide, maleic anhydride and ethylene glycol in the respective proportions as correspondingly listed in Table I. Each mixture contained the carboxy equivalent and the hydroxy equivalent to epoxy equivalent ratios as correspondingly listed in Table I. The mixtures were heated until they became homogeneous, occurring at about 80° C. The mixtures were then heated at temperatures of 80° C., 100° C., or 120° C. as correspondingly listed in Table II during which times gels were formed. The mixtures and gels were then heated at 80° C., 120° C. or 160° C. as correspondingly indicated in Table II under the heading of Post Cure. Infusible resins having the properties correspondingly listed in Table II were obtained from each mixture.

Table I

| Example Number | Parts of Diepoxide | Parts of Maleic Anhydride | Parts of Ethylene Glycol | Carboxy to Epoxy Equivalents | Hydroxy to Epoxy Equivalents |
|---|---|---|---|---|---|
| 1 | 246 | 25 | 10 | 0.16 | 0.08 |
| 2 | 246 | 50 | 16 | 0.33 | 0.16 |
| 3 | 246 | 50 | 31 | 0.33 | 0.33 |
| 4 | 123 | 25 | 32 | 0.33 | 0.67 |
| 5 | 123 | 171 | 8 | 2.33 | 0.16 |
| 6 | 123 | 171 | 31 | 2.33 | 0.67 |
| 7 | 123 | 171 | 46 | 2.33 | 1.00 |
| 8 | 123 | 171 | 61 | 2.33 | 1.33 |
| 9 | 123 | 171 | 76 | 2.33 | 1.67 |
| 10 | 123 | 250 | 32 | 3.33 | 0.67 |
| 11 | 123 | 250 | 64 | 3.33 | 1.33 |
| 12 | 123 | 300 | 32 | 4.00 | 0.67 |
| 13 | 123 | 300 | 46 | 4.00 | 1.00 |
| 14 | 123 | 300 | 61 | 4.00 | 1.33 |
| 15 | 123 | 300 | 76 | 4.00 | 1.67 |
| 16 | 123 | 300 | 91 | 4.00 | 2.00 |
| 17 | 123 | 342 | 31 | 4.66 | 0.67 |
| 18 | 123 | 371 | 31 | 5.00 | 0.67 |
| 19 | 123 | 371 | 91 | 5.00 | 2.00 |

Table II

| Ex. No. | Gel Time and Temperature (hours) | | | Post Cure (hours) | | | Resin Properties |
|---|---|---|---|---|---|---|---|
| | 80° C. | 100° C. | 120° C. | 80° C. | 120° C. | 160° C. | |
| 1 | | 4.5 | 15.0 | | | 6.0 | Firm. |
| 2 | | 4.5 | 15.0 | | | 6.0 | Do. |
| 3 | | | 8.5 | | 8.5 | | Do. |
| 4 | | 4.5 | 15.0 | | | 6.0 | Firm, tacky. |
| 5 | | | 0.25 | 7.5 | 0.5 | | Barcol hardness of 45. |
| 6 | 0.25 | | | 6.5 | | 6.0 | Do. |
| 7 | 0.25 | | | 6.5 | | 6.0 | Barcol hardness of 38. |
| 8 | 0.25 | | | 6.5 | | 6.0 | Barcol hardness of 36. |
| 9 | 0.66 | | | 6.5 | | 6.0 | Hard. |
| 10 | | 2.3 | | 4.5 | 2.5 | 6.0 | Barcol hardness of 52. |
| 11 | 2.75 | | | 7.0 | | 6.0 | Barcol hardness of 32. |
| 12 | 10.5 | | | 11.5 | | 6.0 | Tough, Barcol hardness of 27. |
| 13 | 7.5 | | | 7.5 | 0.5 | | Hard. |
| 14 | 1.1 | | | | 6.5 | 6.0 | Barcol hardness of 40. |
| 15 | 1.0 | | | | 6.5 | 6.0 | Barcol hardness of 32. |
| 16 | 1.0 | | | | 6.5 | 6.0 | Barcol hardness of 26. |
| 17 | 7.5 | | | 7.5 | 0.5 | | Soft |
| 18 | | | 0.25 | 7.5 | 0.5 | | Do. |
| 19 | | | 8.0 | | | 6.0 | Hard. |

EXAMPLES 20 THROUGH 25

Six mixtures, each containing dicyclopentadiene dioxide, maleic anhydride and ethylene glycol in the respective proportions as correspondingly listed in Table III below, were prepared. To each mixture 0.176 part of benzyldimethylamine catalyst was added. This amount of catalyst represented about 0.1 percent by weight of diepoxide in each mixture. Each mixture contained such proportions of anhydride, glycol and diepoxide as provided the ratios of carboxy and hydroxy equivalent for each epoxy equivalent as listed in Table III. The mixtures were then heated until they became homogeneous, occurring at a temperature of about 80° C. and then were heated at 80° C. and then at 100° C. for the respective times listed in Table IV. They were then heated at 160° C. for 6 additional hours after which time infusible resins having the properties listed in Table IV were obtained.

Table III

| Example Number | Parts of Diepoxide | Parts of Maleic Anhydride | Parts of Ethylene Glycol | Carboxy to Eopxy Equivalents | Hydroxy to Epoxy Equivalents |
|---|---|---|---|---|---|
| 20 | 203 | 121 | 26 | 1.00 | 0.33 |
| 21 | 182 | 145 | 23 | 1.33 | 0.33 |
| 22 | 165 | 164 | 21 | 1.67 | 0.33 |
| 23 | 151 | 180 | 19 | 2.00 | 0.33 |
| 24 | 139 | 194 | 17 | 2.33 | 0.33 |
| 25 | 129 | 205 | 16 | 2.67 | 0.33 |

Table IV

| Example Number | Cure (hours) at— | | Barcol Hardness | Heat Distortion ° C. | Izod Impact |
|---|---|---|---|---|---|
| | 80° C. | 100° C. | | | |
| 20 | 4.0 | 1.5 | 45 | 184 | 0.2 |
| 21 | 4.0 | 1.5 | 52 | 213 | 0.2 |
| 22 | 3.0 | 1.5 | 54 | 232 | 0.3 |
| 23 | 5.8 | 2.0 | 58 | 224 | 0.4 |
| 24 | 5.8 | 2.0 | 51 | 239 | 0.9 |
| 25 | 4.0 | 1.5 | 51 | 201 | 0.3 |

EXAMPLES 26 THROUGH 29

Five mixtures were prepared from various proportions of dicyclopentadiene dioxide, various proportions of various polycarboxylic anhydrides and various polyols. Each mixture contained such proportions as provided 2 carboxy equivalents of anhydride and 0.33 hydroxy equivalent of diepoxide, anhydride and polyol. The gel times and temperatures to form gels and the properties of resins formed from each mixture are correspondingly listed in Table V.

Table V

| Example Number | Parts of Diepoxide | Anhydride | | Polyol | | Gel Time and Temperature | | Resin Properties |
|---|---|---|---|---|---|---|---|---|
| | | Name | Parts | Name | Parts | (Hours) | (° C.) | |
| 26 | 490 | Phthalic | 890 | Ethylene glycol | 62 | 0.37 | 120 | Infusible Barcol hardness of 47. |
| 27 | 245 | Dichloro-maleic | 510 | do | 31 | On dissolving | | Infusible. |
| 28 | 245 | Chlorendic | 1,110 | Polyethylene glycol, avg. mol. wt. 200. | 100 | 0.2 | 100 | Do. |
| 29 | 490 | Polyadipic | 760 | Glycerol | 62 | {4.0 / 2.3} | {100 / 120} | Do. |

EXAMPLE 30

A mixture was prepared from 139 parts of dicyclopentadiene dioxide, 194 parts of maleic anhydride, 17 parts of glycerol and 1 drop or 0.176 part of benzyldimethylamine catalyst. The amount of catalyst represented 0.1 weight percent based on the weight of diepoxide. The respective proportions of diepoxide, anhydride and polyol where such as provided 2.33 carboxy equivalents of the anhydride and 0.33 hydroxy equivalent of the polyol for each epoxy equivalent of the diepoxide. The mixture was heated until it became homogenous, occurring at a temperature of about 80° C. The homogeneous mixture was maintained at 80° C. for 4 hours and then raised to a temperature of 100° C. for 1 hour during which time a gel was formed. The gel was maintained at 160° C. for an additional 6 hours, whereupon a hard, infusible resin having a heat distortion of 264° C. and a Barcol hardness of 57 was obtained.

EXAMPLE 31

A mixture comprising 135 parts of dicyclopentadiene dioxide, 190 parts of maleic anhydride and 25 parts of 1,2,6-hexanetriol was prepared. This mixture contained such amounts of diepoxide, anhydride and polyol as provided 2.33 carboxy equivalents of the anhydride and 0.33 hydroxy equivalent of the polyol for each epoxy equivalent of the diepoxide. To the mixture 0.2 part of benzyldimethylamine catalyst was added, which amount represented 0.15 weight percent based on the weight of diepoxide. The mixture was heated until it became homogeneous, occurring at a temperature of about 80° C. The homogeneous mixture was maintained at a temperature of 80° C. for 16 hours during which time a gel was formed. This gel was cured at 120° C. for 8.5 hours and then at 160° C. for 6 hours. A hard, infusible resin having a heat distortion of 224° C. and a Barcol hardness of 53 was obtained.

EXAMPLE 32

A mixture containing 273 parts of dicyclopentadiene dioxide, 196 parts of maleic anhydride and 31 parts of ethylene glycol was prepared. The proportions of diepoxide, anhydride and polyol were such as provided 1.33 carboxy equivalents of anhydride and 0.33 hydroxy equivalent of polyol for each epoxy equivalent of diepoxide. The mixture was heated to homogeneity at a temperature of about 80° C. and then was maintained at 120° C. for 2 hours during which time a gel was formed. This gel was cured for 6 hours at 160° C. and a pale yellow, infusible resin having a Barcol hardness of 43 was obtained.

EXAMPLE 33

A mixture containing 182 parts of dicyclopentadiene dioxide, 145 parts of maleic anhydride and 23 parts of ethylene glycol was prepared. The proportions of diepoxide, anhydride and polyol contained by the mixture provided 1.33 carboxy equivalents of the anhydride and 0.33 hydroxy equivalent of the polyol for each epoxy equivalent of the diepoxide. The mixture was heated to homogeneity, occurring at a temperature of 80° C., and then maintained at 80° C. for 5.75 hours, after which time the temperature was raised to 120° C. and held thereat for 18 hours. During this treatment, a gel was formed. The gel was cured for 6 hours at 160° C. and an infusible resin having a Barcol hardness of 52 and a heat distortion value of 208° C. was obtained.

EXAMPLE 34

A 900 part mixture containing dicyclopentadiene dioxide, maleic anhydride and glycerol in the molar proportions of 7 moles of anhydride and ⅔ mole of glycerol for 3 moles of diepoxide was heated until homogeneous and then allowed to cool to room temperature. The resulting solution was applied with a paint brush to 12 plies of Volan A glass cloth measuring 15 x 15 inches. Each glass ply, after being impregnated with the epoxy mixture, was placed one upon the other and then placed in a cold press (26° C.) and pressure was applied until the thickness of the laminate was about ⅛ inch. The press was then slowly heated over a period of about 10 minutes to 320° F. and this temperature was maintained for an additional 30 minutes after which time the laminate was removed from the press and placed in an oven at 300° F. for 2 hours and then for 6 hours at 400° F. The resulting laminate had the following physical properties:

| Temperature, °F | 75 | 300 | 400 | 500 |
|---|---|---|---|---|
| Flexural strength, p.s.i. | 67,300 | 49,800 | 48,300 | 31,100 |
| Edgewise compression strength, p.s.i. | 42,200 at 75° F. | | | |
| Ultimate tensile strength, p.s.i. | 51,300 at 75° F. | | | |

This experiment demonstrates the excellent strength properties at high temperatures resulting from the use of dicyclopentadiene dioxide, maleic anhydride, and glycerol in glass laminates. Also worth noting are the homogeneity, the ease of handling, and the good wettability toward glass cloth of this system.

EXAMPLE 35

A mixture containing 3 moles of dicyclopentadiene dioxide, 3 moles of maleic anhydride and ⅔ mole of glycerol was prepared by melting together the two solid components, dicyclopentadiene dioxide and maleic anhydride, and then cooling nearly to room temperature before the addition of the glycerol. Vigorous mixing was necessary to obtain a homogeneous solution. Twelve plies, 14" x 14", of 181-Volan A glass were employed. Resin was poured on a sheet of cellophane and the first ply of glass placed on it. More resin was poured on the first ply, another layer of glass was put in place, and so on until the 12 plies were laid up. The cellophane sheet was then folded over to make an envelope and the excess resin was wiped out from the center to the edges of the panel. Entrapped air was thus removed. The layup was placed between laminating plates and transferred to a slightly warm press. The press was closed to stops and the temperature increased gradually until gelation occurred. This took approximately 20 minutes and the temperature reached 270° F. Full steam was then applied and the temperature attained was 325° F. This temperature was held for about 40 minutes or a total press time of one hour. The press was cooled and the panel discharged. After stripping the cellophane, the laminate was postcured in an oven for 6 hours at 400° F. Mechanical properties are given in the table below.

*Table VI*

|   | P.s.i. |
|---|---|
| Flexural strength at 77° F. | 74,700 |
| Flexural modulus at 77° F. | $3.70 \times 10^6$ |
| Flexural strength at 300° F. | 67,800 |
| Flexural modulus at 300° F. | $3.83 \times 10^6$ |
| Flexural strength at 400° F. | 66,400 |
| Flexural modulus at 400° F. | $3.28 \times 10^6$ |
| Flexural strength at 500° F. | 47,100 |
| Flexural modulus at 500° F. | $3.10 \times 10^6$ |
| Tensile strength at 77° F. | 50,300 |
| Tensile modulus at 77° F. | $3.29 \times 10^6$ |
| Edgewise compressive strength at 77° F. | 62,700 |
| Edgewise compressive modulus at 77° F. | $4.10 \times 10^6$ |

EXAMPLES 36 THROUGH 39

Four mixtures, each containing 82 parts of dicyclopentadiene dioxide, 65 parts of maleic anhydride and the respective parts of bisphenol A, i.e., bis (4-hydroxyphenyl)-2,2-propane, as listed in Table VII below, were prepared. Each mixture contained such amounts of diepoxide, anhydride and bisphenol A as provided 1.33 carboxy equivalents of the anhydride and the hydroxy equivalents of bisphenol A as listed in Table VII for each epoxy equivalent of the diepoxide. The mixtures were heated to 120° C. and maintained thereat for 5.75 hours. The temperature was then raised to 160° C. and held there for 6 hours. Hard, infusible resins having the Barcol hardness values correspondingly listed in Table VII were obtained.

Table VII

| Example Number | Bisphenol A (parts) | Hydroxy Equivalents per Epoxy Equivalents | Barcol Hardness |
|---|---|---|---|
| 36 | 38 | 0.33 | [1] 58 |
| 37 | 76 | 0.66 | [1] 56 |
| 38 | 114 | 1.00 | 45 |
| 39 | 152 | 1.33 | |

[1] Tough.

EXAMPLES 40 THROUGH 44

Four mixtures, each containing 82 parts of dicyclopentadiene dioxide, 65 parts of maleic anhydride and the respective parts of 2,4,6-trimethylolphenyl allyl ether as listed in Table VIII below, were prepared. The mixtures contained such amounts of diepoxide, anhydride and 2,4,6-trimethylolphenyl allyl ether as provided 1.33 carboxy equivalents of anhydride and the hydroxy equivalents of the ether as listed in Table VIII for each epoxy equivalent of the diepoxide. The mixtures were heated to 120° C. and maintained thereat for 5.7 hours. The temperature was then raised to 160° C. and held thereat for 6 additional hours. Yellow to amber colored, infusible resins having the properties listed in Table VIII were obtained.

Table VIII

| Example | Trimethylolphenyl Allyl Ether (parts) | Hydroxy Equivalents per Epoxy Equivalents | Resin Description |
|---|---|---|---|
| 40 | 25 | 0.33 | Tough, Barcol hardness of 42. |
| 41 | 50 | 0.66 | Hard. |
| 42 | 75 | 1.00 | Do. |
| 43 | 100 | 1.33 | Do. |

EXAMPLE 44

A 23.1 weight percent solution (1085 grams) of peracetic acid in ethyl acetate was added dropwise with stirring to 198 grams of dicyclopentadiene at 40° C. During the 1⅔ hours required for the addition, the temperature was maintained at 40° C. by cooling when necessary. After an additional 4-hour reaction period an analysis for peracetic acid indicated that the reaction was completed. The reaction mixture was diluted with 1 liter of ethylbenzene and the ethyl acetate, acetic acid, and part of the ethylbenzene were removed on a still column under reduced pressure. After removal of all of the acetic acid the product solution in ethylbenzene was cooled to −10° C. The crystalline dicyclopentadiene dioxide was removed by filtration. A 123 gram yield of dicyclopentadiene dioxide having a melting point of 183 to 185° C. was obtained. By reducing the filtrate volume two additional portions of crystalline product were obtained totaling 95 grams and having a melting point range of 178 to 181° C. The yield, based on the dicyclopentadiene charged, was 88.7 percent of the theoretical.

EXAMPLE 45

A mixture comprising 68.8 parts of dicyclopentadiene dioxide, 40 parts of maleic anhydride and 11.2 parts of trimethylolethane was prepared. This mixture contained such amounts of diepoxide, anhydride and polyol as provided one carboxy equivalent of the anhydride and 0.33 hydroxy equivalent of the polyol for each epoxy equivalent of the diepoxide. The mixture was heated until it become homogeneous, occurring at a temperature of about 80° C. The homogeneous mixture was maintained at a temperature of 80° C. for five hours. The temperature was then raised to 120° C. and maintained thereat for 19 hours during which time gelation occurred. This gel was cured for six hours at 160° C. and for 64 hours at 250° C. The resulting dark colored resin had a Barcol hardness of 62 and a heat distortion point of 297° C.

Novel polymers having unique properties also can be made from mixtures of dicyclopentadiene dioxide, polyols, unsaturated polycarboxylic anhydrides which contain at least one polymerizable olefinic group, e.g., maleic anhydride, tetrahydrophthalic anhydride, and the like, and an unsaturated carbon compound containing one or more polymerizable double bonds, e.g., styrene, acrylic and methacrylic acids and their esters, vinyl chloride, vinyl acetate, vinylidene chloride, butadiene and the like. These mixtures are simply prepared by mixing the diepoxide, unsaturated anhydride, polyol and unsaturated carbon compound in the manner set forth hereinbefore. In the event the unsaturated carbon compound is in the gaseous state at the desired working temperature, e.g., vinyl chloride, higher pressures can be employed to obtain a homogeneous mixture or any of the well known methods in the art for handling and mixing gaseous unsaturated carbon compounds may be used. A vinyl-type addition polymerization catalyst, such as a free radical polymerization catalyst or an ionic polymerization catalyst, or both, is added prior to polymerizing. Typical free radical polymerization catalysts include benzoyl peroxide, cumene hydroperoxide, azomethane and the like. Strong alkalis, mineral acids and metal halide Lewis acids and complexes thereof such as those hereinbefore specified are typical of ionic polymerization catalysts. After addition of the catalyst the temperature of the mixture is maintained at a point within the ranges specified hereinbefore. Polymerization takes place as hereinbefore described and at the same time vinyl-type addition polymerization through the polymerizable double bonds of the unsaturated anhydride and the unsaturated carbon compounds occurs. The physical properties of the polymers obtained and the polymerization process characteristics can be varied by changing the types and relative proportions of diepoxide, unsaturated anhydride, polyol and unsaturated carbon compound in the polymerizable mixture. Other variations in polymer properties can be brought about by employing an unsaturated polyol, having polymerizable double bonds. In this instance the polycarboxylic anhydride can be saturated or unsaturated depending upon the particular polymer properties and/or the particular process characteristics desired.

What is claimed is:
1. A curable composition comprising dicyclopentadiene dioxide, a polycarboxylic acid anhydride, and a polyol selected from the group consisting of polyhydric alcohols and polyhydric phenols, in such relative amounts so as to provide from about 0.16 to 5.0 carboxy equivalents of said anhydride and up to 2.0 hydroxyl equivalents of said polyol for each epoxy equivalent of said dicyclopentadiene dioxide.

2. A solid resin obtained by heating the curable composition defined in claim 1.

3. A curable composition comprising dicyclopentadiene dioxide, a polycarboxylic acid anhydride, and a polyol selected from the group consisting of polyhydric alcohols and polyhydric phenols, in such relative amounts so as to provide from about 0.33 to 4.0 carboxy equivalents of said anhydride and from about 0.16 to 2.0 hydroxyl equivalents of said polyol for each epoxy equivalent of said dicyclopentadiene dioxide.

4. A solid resin obtained by heating the curable composition defined in claim 3.

5. A curable composition comprising dicyclopentadiene dioxide, maleic anhydride, and ethylene glycol, in such relative amounts so as to provide from about 0.33 to 4.0 carboxy equivalents of said maleic anhydride and from about 0.16 to 2.0 hydroxyl equivalents of said ethylene glycol for each epoxy equivalent of said dicyclopentadiene dioxide.

6. A solid resin obtained by heating the curable composition defined in claim 5.

7. A curable composition comprising dicyclopentadiene dioxide, maleic anhydride, and 1,2,6-hexanetriol, in such relative amounts so as to provide from about 0.33 to 4.0 carboxy equivalents of said maleic anhydride and from about 0.16 to 2.0 hydroxyl equivalents of said 1,2,6-hexanetriol for each epoxy equivalent of said dicyclopentadiene dioxide.

8. A solid resin obtained by heating the curable composition defined in claim 7.

9. A curable composition comprising dicyclopentadiene dioxide, maleic anhydride, and glycerol, in such relative amounts so as to provide from about 0.33 to 4.0 carboxy equivalents of said maleic anhydride and from about 0.16 to 2.0 hydroxyl equivalents of said glycerol for each epoxy equivalent of said dicyclopentadiene dioxide.

10. A solid resin obtained by heating the curable composition defined in claim 9.

11. A curable composition comprising dicyclopentadiene dioxide, phthalic anhydride, and ethylene glycol, in such relative amounts so as to provide from about 0.33 to 4.0 carboxy equivalents of said phthalic anhydride and from about 0.16 to 2.0 hydroxyl equivalents of said ethylene glycol for each epoxy equivalent of said dicyclopentadiene dioxide.

12. A solid resin obtained by heating the curable composition defined in claim 11.

13. A curable composition comprising dicyclopentadiene dioxide, chloromaleic anhydride, and ethylene glycol, in such relative amounts so as to provide from about 0.33 to 4.0 carboxy equivalents of said chloromaleic anhydride and from about 0.16 to 2.0 hydroxy equivalents of said ethylene glycol for each epoxy equivalent of said dicyclopentadiene dioxide.

14. A solid resin obtained by heating the curable composition defined in claim 13.

References Cited in the file of this patent

UNITED STATES PATENTS

| | | |
|---|---|---|
| 2,609,357 | Koroly | Sept. 2, 1952 |
| 2,720,500 | Cody | Oct. 11, 1955 |
| 2,890,196 | Phillips et al. | June 9, 1959 |

FOREIGN PATENTS

| | | |
|---|---|---|
| 187,900 | Austria | Dec. 10, 1956 |

UNITED STATES PATENT OFFICE
CERTIFICATE OF CORRECTION

Patent No. 2,985,616                                         May 23, 1961

Charles W. McGary, Jr., et al.

It is hereby certified that error appears in the above numbered patent requiring correction and that the said Letters Patent should read as corrected below.

Column 3, line 43, for "polycarboxy" read -- polycarboxylic --; column 6, line 57, for "GYXJ" read -- GYZJ --; line 58, for "57T" read -- 47T --; column 12, line 4, for "theerat" read -- thereat --.

Signed and sealed this 17th day of October 1961.

(SEAL)
Attest:

ERNEST W. SWIDER                                    DAVID L. LADD
Attesting Officer                                     Commissioner of Patents

USCOMM-DC